United States Patent [19]

Martin

[11] 4,124,337

[45] Nov. 7, 1978

[54] POST CURE INFLATOR

[75] Inventor: Joseph M. Martin, Leetonia, Ohio

[73] Assignee: NRM Corporation, Akron, Ohio

[21] Appl. No.: 782,496

[22] Filed: Mar. 29, 1977

[51] Int. Cl.$^2$ ............................................. B29H 5/02
[52] U.S. Cl. .................................. 425/28 P; 425/36; 425/44; 425/47
[58] Field of Search ...................... 425/19, 21, 23, 24, 425/28 P, 29, 36, 38, 44, 58

[56] References Cited

U.S. PATENT DOCUMENTS

| | | | |
|---|---|---|---|
| 3,015,845 | 1/1962 | Duerksen | 425/23 |
| 3,075,237 | 1/1963 | Soderquist | 425/44 |
| 3,170,187 | 2/1965 | Brundoge | 425/44 X |
| 3,184,794 | 5/1965 | Sherkin | 425/19 |
| 3,214,791 | 11/1965 | Erickson et al. | 425/29 |
| 3,605,182 | 9/1971 | Ulm | 425/28 P |
| 3,621,520 | 11/1971 | Ulm | 425/28 P |
| 3,683,981 | 8/1972 | Branick | 425/36 X |
| 3,793,420 | 2/1974 | Fredricks et al. | 425/58 X |

Primary Examiner—J. Howard Flint, Jr.
Attorney, Agent, or Firm—Maky, Renner, Otto & Boisselle

[57] ABSTRACT

A flip-over PCI which includes a rotatable or oscillatable frame having pairs of tire engaging rims mounted thereon, the inner rim of each pair being fixed to the frame on opposite sides thereof and including an axially projecting and axially rotatable lock shaft, the outer rim of each pair including a housing for the lock shaft. The lock shaft and housing are constructed for alignment and safety so that the outer rim cannot rotate with respect to the inner rim and the lock shaft can rotate with respect to the outer rim only when the two rims are adjacent each other when the tire is not inflated. The rotation of the outer rim is precluded by an interference between the two rims when closely adjacent each other and by an interference between the shaft and housing when the rims are separated. One or the other of such interferences is always operative.

23 Claims, 11 Drawing Figures

POST CURE INFLATOR

This invention relates generally as indicated to a post cure inflator and more particularly to a post cure inflator of simplified design having a fail-safe lock mechanism for joining the rim assemblies.

Many prior art flip-over post cure inflators support the outer rim on an elevator frame or yoke for movement to open and close the rim assemblies, the entire elevator frame moving when the unit is rotated or oscillated. An example of such a mechanism may be seen in U.S. Pat. No. 3,483,596. With such mechanisms, the outer rim is precluded from relative rotation with respect to the inner rim by its mounting on the frame or yoke. Accordingly, conventional bayonet locks may be employed for locking the rims together.

However, to simplify the post cure inflator, it is desirable that the outer rim not be mounted on a frame or yoke. To avoid such frame or yoke, the outer rim, in the lock and load portion of the cycle, may be engaged by a chuck on an elevator transferring the outer rim from a position beneath a tire conveyor to the lock position and vice versa. However, with such a construction, utilizing a bayonet lock, inadvertent rotation of the outer rim assembly must be avoided both for alignment and safety reasons. Without the present invention, inadvertent rotation of the outer rim with respect to the inner rim or lock shaft might cause the rims to separate while the tire is inflated. Moreover, rotation of the outer rim might preclude the elevator chuck from properly engaging the outer rim during the lock and load cycle.

More particularly, the present invention relates to a flip-over post cure inflator which includes a rotatable or oscillatable frame having pairs of tire engaging rims mounted thereon, the inner rim of each pair being fixed to the frame on opposite sides thereof and including an axially projecting and axially rotatable lock shaft, the outer rim of each pair including a housing for the lock shaft. The rims include bead seats which are brought closely adjacent each other to properly seat a tire therebetween for inflation. When the tire is inflated, the rims separate to a limited extent. When in proper position, during the load and lock cycle or unlock and unload cycle, an elevator beneath the frame engages the outer rim and moves the same adjacent the inner rim to permit the rims to be unlocked and then lowers the outer rim place a tire on a discharge conveyor and receive the next tire.

The lock shaft and housing are constructed for alignment and safety so that the outer rim cannot rotate with respect to the inner rim and the lock shaft can rotate with respect to the outer rim only when the two rims are adjacent each other when the tire is not inflated. The rotation of the outer rim is precluded by an interference between the two rims when closely adjacent each other and by an interference between the shaft and housing when the rims are locked, yet separated. One or the other of such interferences is always operative during the lock, inflation, and unlock portions of the cycle. During the load and unload portions of the cycle, the outer rim is locked to the elevator chuck against rotation.

It is accordingly a principal object of the present invention to provide a simplified flip-over post cure inflator not requiring the frames supporting the outer rims during rotation or oscillation of the inflator.

Another principal object is the provision of such simplified post cure inflator utilizing a fail-safe, yet simplified, lock mechanism.

Another important object is the provision of a post cure inflator of the type noted wherein inadvertent rotation of the outer rim assembly during lock, inflation, unlock, unload, and load is precluded.

Still another object is the provision of such post cure inflator having a lock shaft on the inner rim and a housing on the outer rim constructed for alignment and safety so that the outer rim cannot rotate with respect to the inner rim and the lock shaft can rotate with respect to the outer rim only when the two rims are adjacent each other when the tire is not inflated.

A yet further object is the provision of such post cure inflator wherein rotation of the outer rim is precluded by an interference between the two rims when the rims are closely adjacent each other and by an interference between the shaft and housing when the rims are separated.

A still further object is the provision of such post cure inflator wherein one or the other of such interferences will always be operative during the lock, inflation, and unlock portions of the cycle.

Another object is the provision of a post cure inflator of the type noted utilizing an elevator for raising and lowering the outer rim during loading and unloading, such elevator including a chuck gripping the outer ring and precluding rotation of the rim.

A further object is the provision of such post cure inflator utilizing a lock means which comprises a key projecting from one rim and a keyhole slot in the other, with means mechanically to preclude relative rotation between the key and slot except when the rims are adjacent each other.

These and other objects and advantages of the invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

Figure 1:
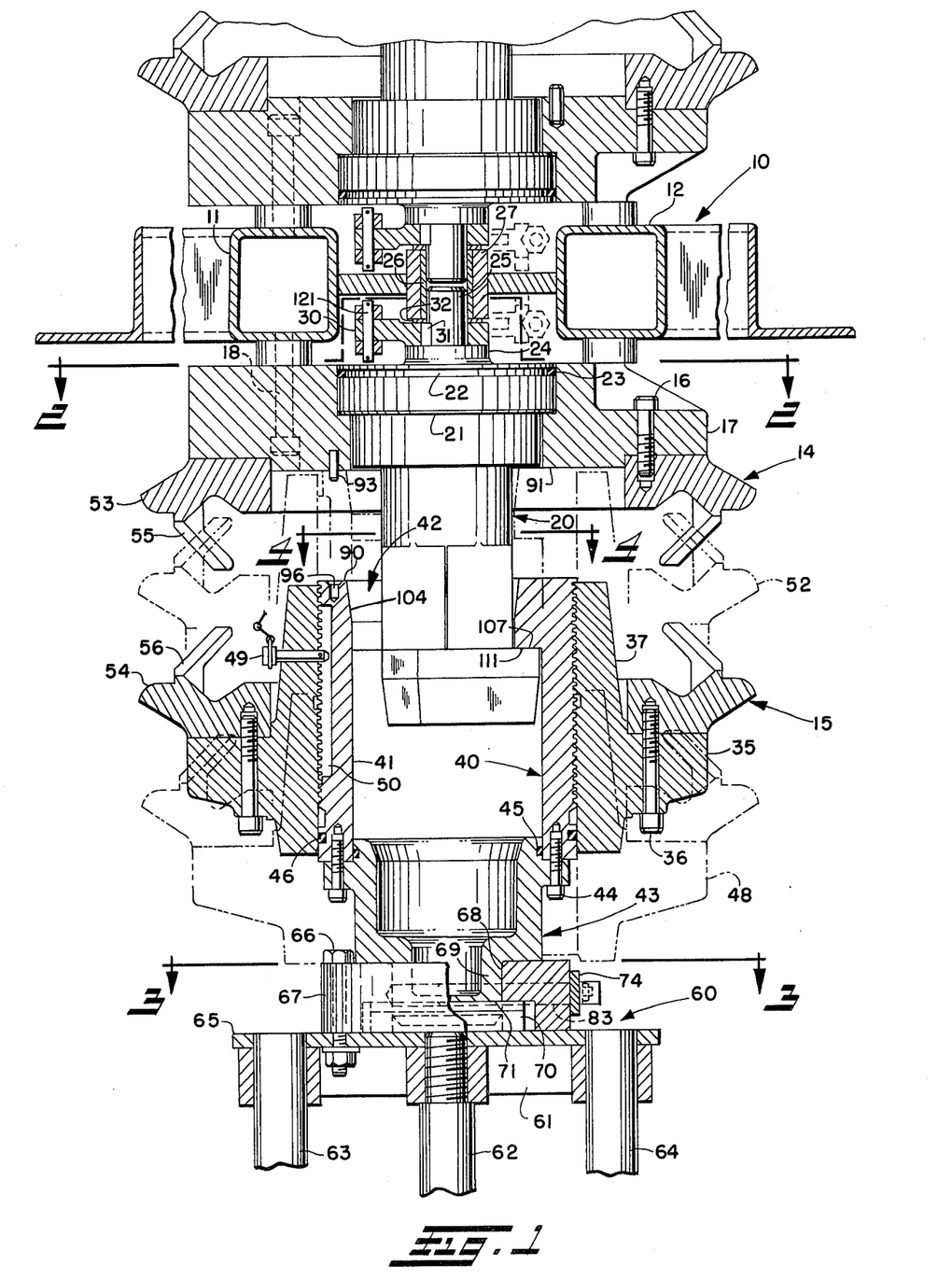
FIG. 1 is a vertical section partially broken away showing one of the pair of rims of the inflator locked together and also showing the elevator engaging the outer or lower rim.

Referring first to FIG. 1; the post cure inflator comprises a trunnion frame 10 which is rotatable or oscillatable about a pivot axis extending normal to the plane of such figure. The frame includes two horizontal main frame members 11 and 12 which may be symmetrically disposed about such axis and which are supported at each end for such rotation or oscillation. Post cure inflators are generally designed to be positioned at the rear of a dual cavity tire curing press. Accordingly, the post cure inflator normally will have four pairs of inflating rims, two pairs on each side of the frame, with opposed pairs receiving tires from one cavity of the press to post cure the tire while inflated during substantially two cycles of the press. In FIG. 1, only one of the four pairs of rims is illustrated completely with a portion of a pair opposite the illustrated pair being shown fragmentally.

Each pair of rims includes an inner rim 14 and an outer rim 15, the inner rim in turn being secured by fasteners 16 to support 17 which is in turn secured to the frame 10 by fasteners 18. The inner rim is thus fixed to the frame.

Projecting through the support 17 and generally axially of the rim 14 is an axially rotatable lock shaft 20. The shaft 20 includes an enlarged portion forming a shoulder 21 seated on a shoulder of the support 17. Such enlarged portion includes a groove 22 for seal 23. The inner end of the lock shaft is provided with a reduced diameter shoulder 24 from which projects stub shaft 25. The stub shaft is mounted within a bushing 26 in hub 27 which is part of the frame 10.

Positioned between the shoulder 24 and the hub 27 is a crank arm 30 keyed to the stub shaft 25 as indicated at 31. A thrust bearing 32 is positioned between the crank arm and the hub 27. The profile configuration of the crank arm is seen in greater detail in FIG. 2.

The outer bead ring 15 is mounted on support 35 by fasteners 36, such support including an axially elongated internally threaded cylindrical sleeve portion 37. The internally threaded sleeve receives and supports an externally threaded two-part cylindrical housing 40. The upper or externally threaded portion 41 of the housing 40 includes a top opening 42 having the profile configuration seen more clearly in FIG. 4.

The lower cup-shape portion 43 of the housing 40 is secured to the upper portion 41 by fasteners 44. Air seals 45 and 46 are provided between the lower portion 43 of the housing and the upper portion 41, and the latter and the support 35, respectively. The threaded connection between the housing and the support permits vertical adjustment from the full line position shown to the phantom line position seen at 48. Once the desired vertical adjustment is obtained, relative rotation between the support and housing is precluded by the pin 49, the tip of which is maintained in vertical slot 50. In the illustrated embodiment, with such adjustment, the bead engaging rims 14 and 15 can establish a 6 inch (152.4 mm) minimum rim width or a 10 inch (254 mm) maximum rim width. For a passenger tire size unit, the range may be 5 inches (127 mm) to 8 inches (203.2 mm). With the adjustment in the full line position shown, the bottom rim can be brought to the phantom line position 52 actually slightly compressing the tire beads between the bead shoulders 53 and 53. In such position, the inclined pilot and centering surfaces 55 and 56, on the respective rims, will intermesh.

Vertical movement of the bottom or outer rim is obtained by an elevator shown generally at 60. Such elevator comprises a frame 61 to which is secured the rod 62 of a vertically oriented piston-cylinder assembly, not shown. The frame is provided also with vertically extending guide rods 63 and 64.

Secured to the top plate 65 of the frame by fasteners 66 is an annular chuck ring 67. The center hole 68 in the chuck ring is designed to receive the projection 69 on the bottom of the lower portion 43 of the housing 40. The bottom exterior edge of the projection 69 and the upper interior edge of the hole 68 are provided with suitable pilot or lead-in surfaces as indicated. Secured to the ring 67 and extending across the hole 68 at the bottom thereof is a diametral key 70, the upper edges of which are chamfered as indicated. The key fits in a similarly tapered or chamfered diametral slot 71 in the bottom face of projection 69 of housing portion 43. The key 70 and slot 71 preclude relative rotation between the ring 67 or elevator 60 and the housing 40, thus precluding axial misalignment.

Figures 2, 3, 4:
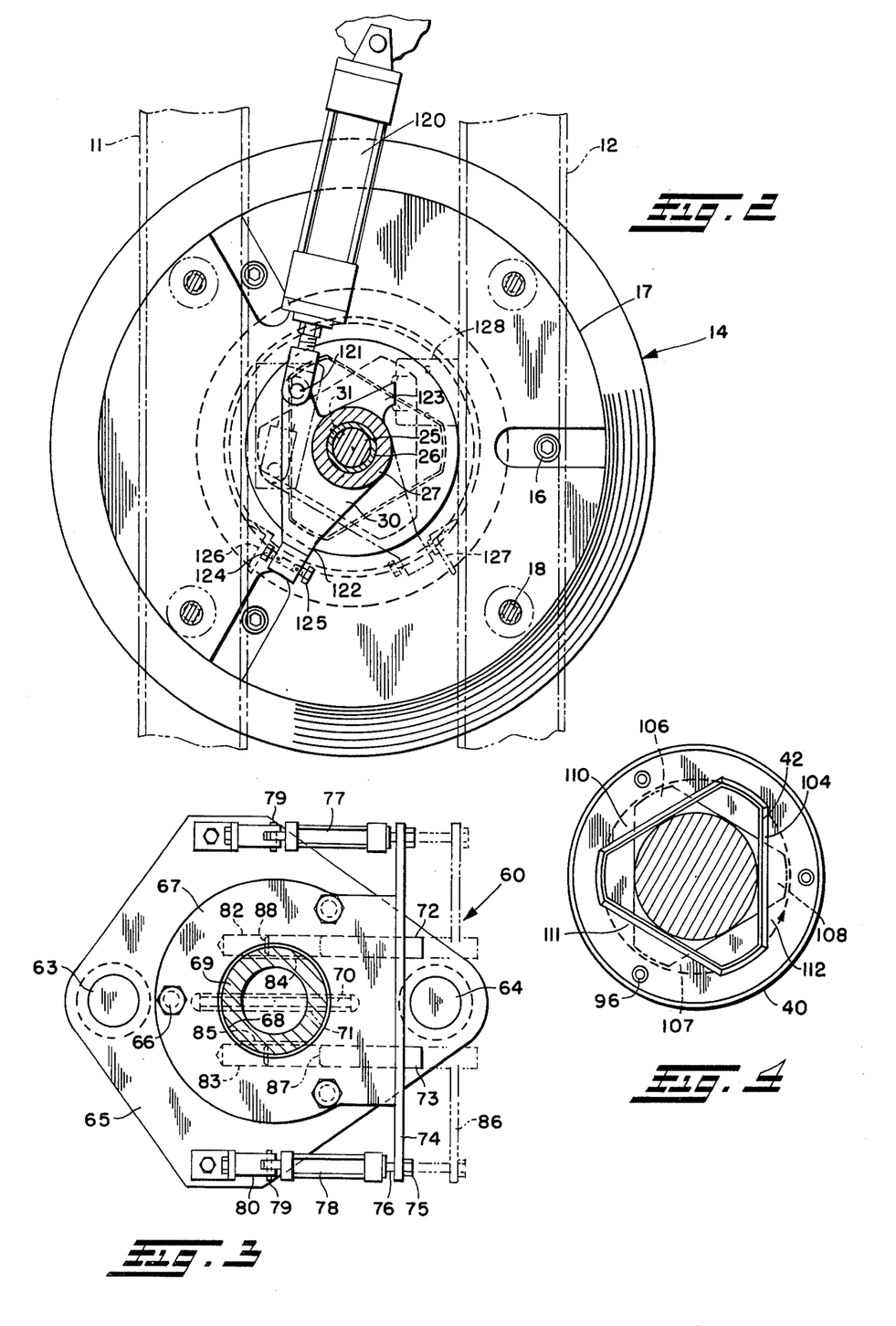
FIG. 2 is a horizontal section taken substantially on the line 2—2 of FIG. 1 showing the lock shaft operator.
FIG. 3 is a horizontal section taken substantially on the line 3—3 of FIG. 1 illustrating the elevator chuck.
FIG. 4 is a horizontal section taken substantially on the line 4—4 of FIG. 1 illustrating the lock shaft fitting within the keyhole housing and, in dotted lines, rotated to a lock position.
Figure 5:
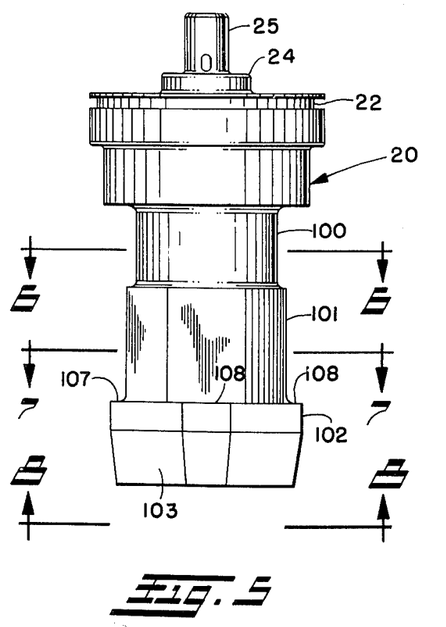
FIG. 5 is an elevation of the lock shaft of the preferred embodiment of the invention.

Referring now additionally to FIG. 3, in order releasably to secure the housing 40 to the elevator 60, there are employed two parallel lock pins 72 and 73 secured to bar 74, the ends of which are secured at 75 to the rods 76 of piston-cylinder assemblies 77 and 78. The blind end of each piston-cylinder assembly is pivotally mounted at 79 to a bracket 80 secured to the elevator plate 65.

The lock pins are slidably mounted in parallel bores 82 and 83, respectively, in the ring 67, such bores each intersecting the hole or central opening 68 therein. The projection 69 of the housing is provided with external parallel circular grooves indicated at 84 and 85 which, when the housing projection is seated in the hole 68, are coaxial with the bores 82 and 83, respectively.

When the piston-cylinder assemblies 77 and 78 are extended to move the bar 74 to the phantom line position seen at 86, the ends of the pins achieve the position seen at 87 clear of the housing projection grooves. In this manner, the housing and elevator may be vertically separated. When the piston-cylinder assemblies 77 and 78 are retracted, as shown, the ends of the pins achieve the position seen at 88 interfering with the grooves 84 and 85, thus locking the housing to the elevator against relative vertical and rotational movement.

When the trunnion carriage is in the position shown in FIG. 1, the housing projection and the elevator socket will be axially aligned. A tire held by the rims 14 and 15 is then deflated and the elevator ascends to engage the housing as shown. Continued upward movement of the elevator moves the outer rim upwardly until the top surface 90 of the housing contacts or moves closely adjacent the inner rim support 17 as indicated at 91. At this point, the shaft 20 may be rotated to unlock the rims as hereinafter described. The elevator then descends with the post cured tire on the rim 15 to place the same on a discharge conveyor, not shown. A tire from the press then rolls onto the conveyor against suitable stops centering the tire with respect to the bottom rim. The elevator ascends again with the new tire moving the rims together to the fully closed position. The shaft 20 is again then rotated to the locked position, the tire is inflated causing the rims to move apart to the extent permitted by the lock, and the elevator is released and descends to its position beneath the conveyor.

While gripped by the elevator 60, the bottom rim 15 cannot rotate. When fully seated against the top rim support 17, the bottom rim cannot rotate with respect to the top rim because of the engagement of pilot or chamfered pins 93 in three chamfered holes 96, respectively, in the top of housing 40. Because of the construction of the shaft 20 and the opening 42 in the top of the housing, only in such fully seated or adjacent position of the rims can the shaft 20 rotate with respect to the rim 15.

Referring now more particularly to FIGS. 4, 5, 6, 7 and 8, the construction of the lock shaft or key and the housing opening or keyslot is better illustrated. The portion of the shaft projecting from the support 16 includes three vertically distinct sections, each having a different horizontal sectional configuration. The upper section indicated at 100 is in the form of a perfect cycle. The intermediate section indicated at 101 has a somewhat longer vertical extent than the section 100 and is in the form of a regular hexagon. The end section of the shaft 20 indicated at 102 is in the general form of an irregular hexagon, perhaps better described as an equilateral triangle with the tips removed and slightly circularized. The configuration of the end section 102 is the same as that of the opening 42 in the housing 40. The lower edge of the section 102 is provided with inwardly tapering pilot lead-in surfaces seen at 103. The opening 42 is provided with outwardly tapering pilot lead-in surfaces seen at 104 in FIG. 1.

Figure 6:
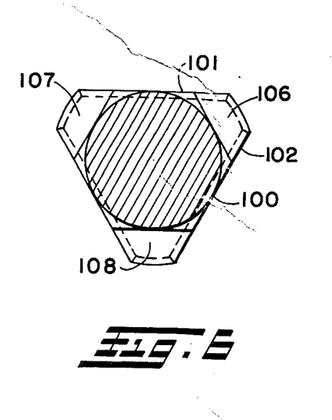
FIG. 6 is a horizontal section taken substantially on the line 6-6 of FIG. 5.
Figure 7:
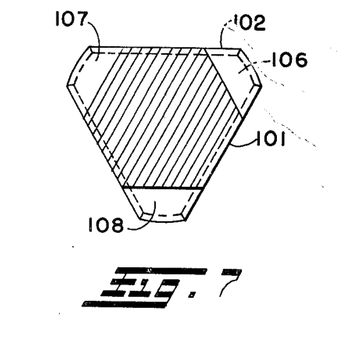
FIG. 7 is a horizontal section taken substantially on the line 7-7 of FIG. 5.
Figure 8:
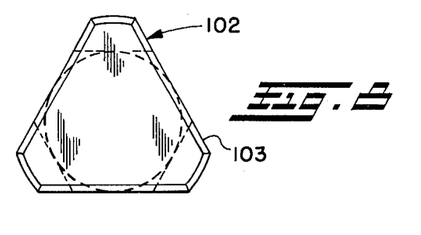
FIG. 8 is a view of the end of the lock shaft taken from the bottom of FIG. 5 substantially from the line 8-8 thereof.

The triangular configuration of the end section 102 provides three equally spaced upwardly directed shoulders projecting from beneath alternate faces of the regular hexagonal section 101 as seen at 106, 107, and 108 in FIGS. 6 and 7. The shape of the end section of the shaft is designed closely to fit the opening 42 in the housing with the projections 106 through 108 fitting beneath the cordal flanges 110, 111 and 112 formed by the alternate longer triangular sides of the opening. In such lock position, the projections move to the dotted line positions seen in FIG. 4.

As seen in comparing FIGS. 5, 6, 7 and 8, the circular section 100 is axially inscribed in the regular hexagonal section 101 and both are inscribed in the triangular sides of the end section 102.

The height of the circular section 100 is slightly vertically longer than the distance from the top of the housing to the underside of the cordal flange as seen at 111 in FIG. 1. This permits the shaft 20 to rotate when the housing is against the stop surface 91 as previously described. The axial length of the hexagonal section 101 is such that as the housing moves away from the stop surface 91 and the pins 93 clear the holes 96, the hexagonal section will engage the triangular longer sides of the opening 42 to preclude relative rotation between the housing and shaft. Thus the pins 93 provide a direct interference between the two rims to preclude relative rotation and the hexagonal section provides an interference between the shaft and housing precluding rotation of the rim 15 before the pins 93 clear the holes 96.

The geometry of the key shaft and the keyhole slot is such that the shaft can be rotated 60° to move the projections 106 through 108 to and from the lock and unlock positions. In either the lock or unlock position, the regular hexagonal section 101 of the shaft 20 cannot rotate within the opening 42.

Rotation of the shaft is obtained by the piston-cylinder assembly 120 seen in FIG. 2. The rod of the piston-cylinder assembly is pin connected to crank arm 30 at 121, such crank arm being keyed to the stub shaft 25 as seen in FIG. 1. The crank arm includes two additional projections as seen at 122 and 123. The projection 122 is provided with adjustable and lockable stop buttons 124 and 125 which are adapted to engage frame stops 126 and 127, respectively. The projection 123 engages tire inflation valve 128 when the crank arm has been rotated against the stop 126 which rotates the lock shaft to its lock position.

In the unlock condition, the rims are brought closely together by the elevator 60. In such condition, the pins 93 will engage the holes 96 keeping the outer rim from rotating with respect to the inner rim. In such position, the hole or aperture 42 in the housing is in horizontal register with the circular portion 100 of the lock shaft. Only in such condition can the shaft be rotated with respect to the housing and thus the outer rim 15. With any substantial pressure in the tire cavity, the elevator will not be able to move the rims together. The elevator cylinders are, however, sized to be able to overcome any low residual pressure which may still be in the tire.

After the tire has been deflated and the lower housing has been raised to the up position by the elevator, the shaft is rotated to an unlocked condition, and the elevator simply descends wtih the post inflated tire. If the shaft is rotated to the locked condition, the valve 128 is energized at the completion of the lock stroke and allows inflation. Then the rim 15 will move away from the rim 14 with the regular hexagonal section 101 of the shaft fitting within the hole 42 in the housing to preclude rotation of the housing as the slots 95 and 96 clear the pins 93 and 94. The elevator chuck is released and the elevator descends to its position beneath the conveyor. The trunnion frame then oscillates.

Figure 9:
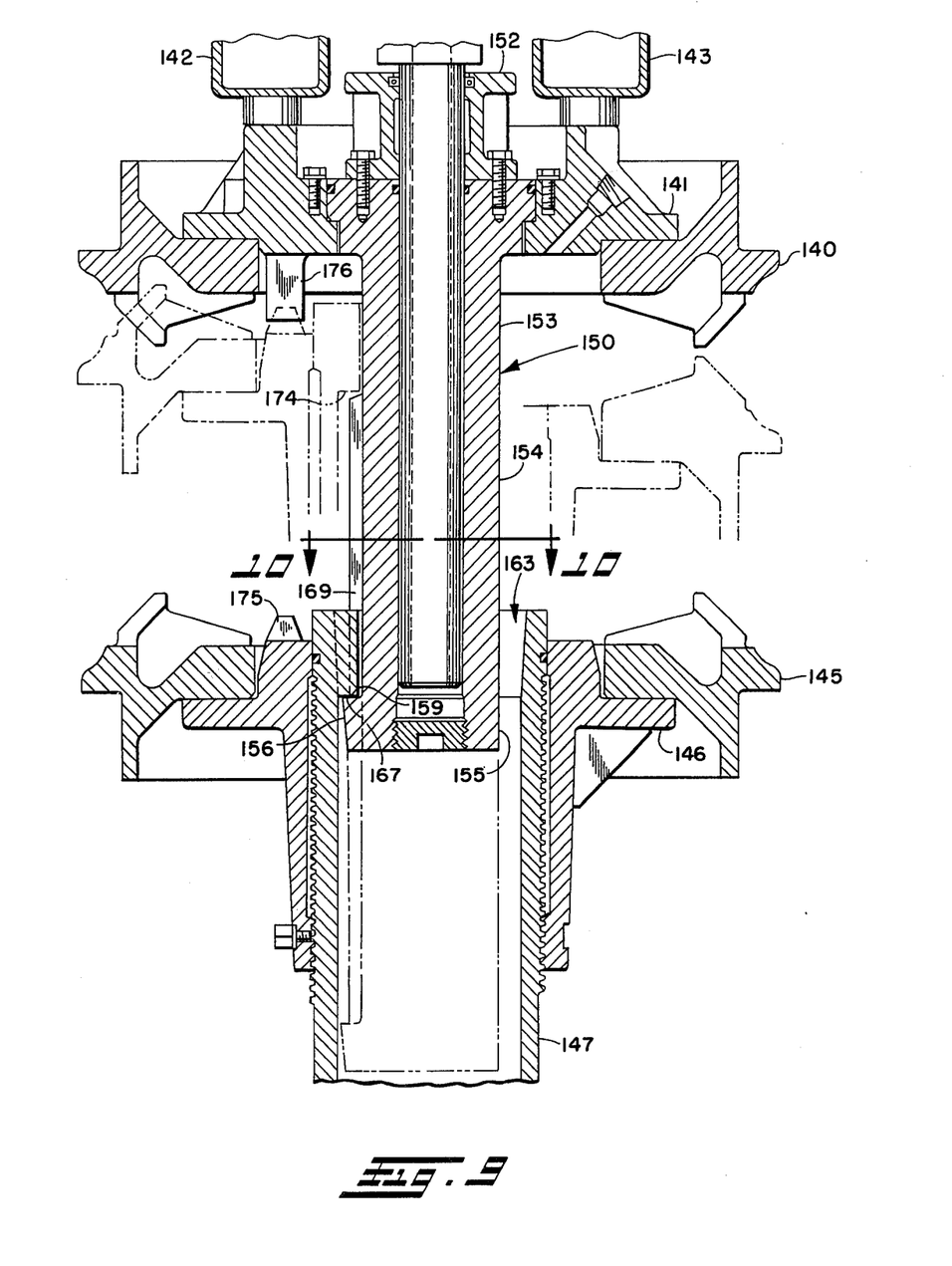
FIG. 9 is a vertical section similar to FIG. 1 illustrating a modified form of the present invention.
Figure 10:
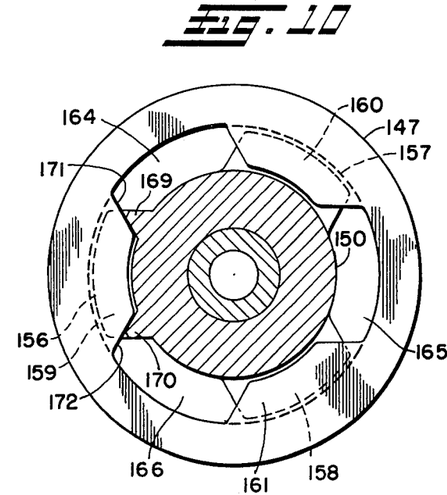
FIG. 10 is a horizontal section taken substantially on the line 10-10 of FIG. 9 showing the lock shaft and housing a locked condition.
Figure 11:
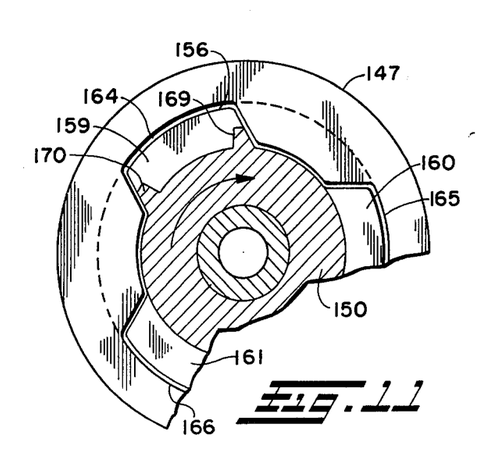
FIG. 11 is a view similar to FIG. 10 showing the lock shaft and housing in an unlocked condition.

Referring now to FIGS. 9, 10 and 11, there is illustrated a somewhat modified form of lock shaft and housing. The inner rim 140 is mounted on support 141 in turn secured to trunnion frame elements 142 and 143. The outer rim 145 is mounted on support 146 which is adjustably threadedly connected to housing 147. The lower end of the housing is constructed and closed as in FIG. 1.

Lock shaft 150 projects through the support 141. A hub 152 is secured to the top thereof and such hub may be connected to a piston cylinder assembly as in FIG. 2 so that the shaft may be rotated 60° in either direction for locking and unlocking.

The lock shaft includes an upper circular 153, an intermediate ribbed section 154, and a lower locking portion 155.

The lower end or locking portion 155 includes three horizontal projections 156, 157 and 158 as best seen in FIG. 10. Such projections present three equally spaced horizontally extending, upwardly facing shoulders 159, 160 and 161.

The opening 163 in the top of the housing is also perhaps better depicted in FIG. 10. The opening includes a center circular portion closely accommodating the center circular portion of the lock shaft 150 and three equally spaced slots 164, 165 and 166 which will accommodate the projections 156, 157 and 158 when the shaft is in the unlock position. The relatively thick flanges between such slots form downwardly facing stop shoulders as seen at 167 in FIG. 9.

Projecting upwardly from the stop surface 159 on the projection 156 of the shaft are two ribs 169 and 170. Such ribs extend the height of the ribbed intermediate section 154 of the lock shaft. The ribs are spaced 60° apart and in the lock condition of the shaft are closely adjacent the circumferentially opposite sides 171 and 172 of the slots 164 and 166, respectively. Such ribs thus straddle the projection in the top of the housing between such slots. In this manner and in this condition, relative rotation between the housing and shaft is precluded.

To unlock the rims, the elevator moves the housing or outer rim 45 upwardly until the downwardly facing shoulder 167 clears such ribs as indicated at 174 in FIG. 9. As soon as such clearance is obtained, the shaft may be rotated with respect to the housing and thus the outer rim 145. Before such clearance is obtained, however, projection 175 on the top of support 146 moves between two spaced fixed projections 176 on the support 141. Thus, before the shaft is free to rotate with respect to the rim 145, the outer rim is precluded from rotation with respect to the inner rim 140 by the interference 175-176. When the rims are adjacent each other and the clearance indicated at 174 is obtained, the shaft may be rotated 60° to position the ribs as shown in FIG. 11. In such position, the elevator may descend disconnecting the outer rim 145 from the inner rim 140. This, of course, occurs only during the lock or unlock and load or unload portion of the cycle.

It can now be seen that there is provided a post cure inflator of simplified construction utilizing an axially rotatable key lock shaft and a keyhole housing which are constructed for alignment and safety so that the outer rim cannot rotate with respect to the inner rim and the lock shaft can rotate with respect to the outer rim only when the two rims are adjacent each other when the tire is not inflated. The rotation of the outer rim is precluded by the interference between the two rims when closely adjacent each other and by the interference between the shaft and housing when the rims are separated. One or the other of such interferences is always operative.

I claim:

1. A post cure tire inflator comprising a pair of separable tire bead engaging rims, means to move said rims adjacent each other to seat a tire therebetween for inflation, lock means to permit limited separation of said rims during inflaltion and to hold said rims thus separated during inflation, said lock means comprising a key projecting from one rim and a keyhole slot in the other, and interference means between said key and slot mechanically to preclude relative rotation between said key and slot except when said rims are adjacent each other.

2. A post cure inflator as set forth in claim 1 wherein said key comprises an axially rotatable shaft rotatable between two positive stop positions, one permitting the insertion and removal of the key in the slot, and the other precluding such insertion and removal.

3. A post cure inflator as set forth in claim 1 wherein said key has an outer end section which generally corresponds to the keyhole, an intermediate section which cannot rotate with respect to the keyhole, and an inner end section which can rotate with respect to the keyhole.

4. A post cure inflator as set forth in claim 3 wherein the outer end section and keyhole are generally triangular, the intermediate section is hexagonal, and the inner end section is circular.

5. A post cure inflator as set forth in claim 4 wherein the hexagonal and circular sections are axially inscribed in the triangular section.

6. A post cure inflator as set forth in claim 3 including a mechanical interference between said rims when closely adjacent each other to preclude relative rotation.

7. A post cure inflator as set forth in claim 6 wherein the interference between said rims engages before the interference between the intermediate section of said key and keyhole disengages as said rims move adjacent each other, and vice versa.

8. A post cure inflator as set forth in claim 6 wherein said mechanical interference between said rims comprises a pin projecting from one and a hole in the other.

9. A post cure inflator as set forth in claim 3 wherein the outer end section includes a radial projection and said keyhole includes a radial slot through which said projection may pass when said key is in one of said positive stop positions, and said intermediate section includes an axially extending rib engaging said slot to preclude relative rotation between said key and slot when said key is in the other of said positive stop positions.

10. A post cure inflator as set forth in claim 9 wherein the outer end section includes at least two radial projections and said keyhole includes at least two radial slots through which said projections may pass when said key is in one of said positive stop positions, and said intermediate section includes at least two axially extending ribs, each rib engaging a circumferentially opposite side of at least one of said slots to preclude relative rotation between said key and slot when the key is in the other of said positive stop positions.

11. A post cure inflator as set forth in claim 10 wherein one rib engages one side of one slot and the other rib engages the circumferentially opposite side of the other slot.

12. A post cure inflator as set forth in claim 9 including a mechanical interference between said rims when closely adjacent each other to preclude relative rotation.

13. A post cure inflator as set forth in claim 12 wherein the interference beween said rims engages before the interference between the intermediate section of said key and keyhole disengages as said rims move adjacent each other, and vice versa.

14. A post cure inflator as set forth in claim 13 wherein said mechanical interference between said rims comprises a projection from one mating with two projections from the other.

15. A PCI assembly comprising a pair of separable tire inflating rims, a rotatable lock shaft on one and a housing for said shaft on the other, means to move said rims together to engage a tire therebetween with the shaft fully entering said housing, means to rotate said shaft a limited extent to preclude the shaft and housing from being disconnected, and interference means between said shaft and housing to preclude rotation of said housing with respect to said shaft as said rims move apart when the tire is pressurized.

16. A PCI assembly as set forth in claim 15 including an interference between said rims when moved together to preclude relative rotation.

17. A PCI assembly as set forth in claim 16 wherein one or the other of said interferences is always operative when the shaft has been rotated such limited extent.

18. In a post cure inflator, a pair of bead rings movable toward and away from each other to seat and inflate a tire therebetween, a lock for said bead rings comprising a projecting key on one ring and a keyhole slot in the other, means to rotate the key within the slot and to lock the rings together, and interference means between said key and slot to preclude relative rotation of said key and slot unless said key is fully inserted in the slot.

19. A post cure inflator as set forth in claim 18 wherein said key includes an intermediate interference section precluding relative rotation between the key and slot.

20. A post cure inflator comprising a trunnion frame, an elevator vertically aligned with said trunnion frame, a ring on said elevator, a pair of tire inflating rims, one secured to said trunnion frame, and the other releasably secured to said one rim and to said elevator, said other rim including an axial projection adapted to fit into and be seated against said ring, and releasable lock means adapted to secure said ring and projection together, said lock means comprising a slide pin in said ring in one position engaging said projection.

21. A post cure inflator as set forth in claim 20 wherein said lock means comprises parallel slide pins in said ring extending normal to the axis thereof, and parallel grooves in said projection adapted to receive said pins when said extension is in and seated against said ring.

22. A post cure inflator as set forth in claim 22 including means axially simultaneously to move said pins to lock and unlock said other rim with respect to said elevator.

23. A post cure inflator as set forth in claim 20 including a key in said ring adapted to engage a slot in said projection to preclude relative rotation between said ring and projection.

* * * * *

UNITED STATES PATENT AND TRADEMARK OFFICE
Certificate

Patent No. 4,124,337                                                                Patented Nov. 7, 1978

Joseph M. Martin

Application having been made by Joseph M. Martin, the inventor named in the patent above identified, and NRM Corp., Akron, Ohio, the assignee, for the issuance of a certificate under the provisions of Title 35, Section 256, of the United States Code, adding the name of Marien Pasztaleniec as a joint inventor, and a showing and proof of facts satisfying the requirements of the said section having been submitted, it is this 28th day of July 1981, certified that the name of the said Marien Pasztaleniec is hereby added to the said patent as a joint inventor with the said Joseph M. Martin.

Fred W. Sherling
*Associate Solicitor.*